(12) United States Patent
Sha et al.

(10) Patent No.: US 12,741,910 B2
(45) Date of Patent: Sep. 22, 2026

(54) DOUBLE-LIQUID GROUTING SLURRY, ITS TECHNOLOGY AND APPLICATION FOR SUPER LARGE DIAMETER UNDERWATER SHIELD ENGINEERING UNDER HIGH WATER PRESSURE CONDITION

(71) Applicants: Ocean University of China, Shandong (CN); China Railway 14th Bureau Group Corporation Limited, Shandong (CN); China Railway 14th Bureau Group Shield Engineering Coporation Limited, Jiangsu (CN)

(72) Inventors: Fei Sha, Shandong (CN); Jian Chen, Shandong (CN); Zhe Zhang, Jiangsu (CN); Peng Chen, Jiangsu (CN); Jianyong Zhang, Jiangsu (CN); Tao Liu, Shandong (CN); Hao Kong, Shandong (CN); Shutong Yang, Shandong (CN); Yixiang Li, Jiangsu (CN); Gongbiao Yang, Shandong (CN); Qingsheng Meng, Shandong (CN)

(Continued)

(73) Assignees: Ocean University of China, Shandong (CN); China Railway 14th Bureau Group Corporation Limited, Shandong (CN); China Railway 14th Bureau Group Shield Engineering Coporation Limited, Jiangsu (CN)

( * ) Notice: Subject to any disclaimer, the term of this patent is extended or adjusted under 35 U.S.C. 154(b) by 858 days.

(21) Appl. No.: 18/089,531

(22) Filed: Dec. 27, 2022

(65) Prior Publication Data

US 2023/0212076 A1 Jul. 6, 2023

(30) Foreign Application Priority Data

Dec. 31, 2021 (CN) ........................ 202111677537.8

(51) Int. Cl.
*C04B 28/26* (2006.01)
*C04B 14/10* (2006.01)
(Continued)

(52) U.S. Cl.
CPC ............ *C04B 28/26* (2013.01); *C04B 14/104* (2013.01); *C04B 14/28* (2013.01);
(Continued)

(58) Field of Classification Search
CPC ....... C04B 28/26; C04B 14/104; C04B 14/28; C04B 14/4668; C04B 16/0633; C04B 24/2641; C04B 24/383; E21D 11/105
See application file for complete search history.

(56) References Cited

U.S. PATENT DOCUMENTS

2023/0212074 A1* 7/2023 Sha ........................ C04B 28/02
405/150.2

FOREIGN PATENT DOCUMENTS

CN 107619236 1/2018
CN 112723836 4/2021

* cited by examiner

*Primary Examiner* — John E Uselding
(74) *Attorney, Agent, or Firm* — JCIPRNET

(57) ABSTRACT

This invention discloses a double-liquid grouting slurry, its technology and application for super large diameter underwater shield engineering under high water pressure condition. The materials of slurry I are: 35-45 parts of cement clinker; 15-25 parts of slag; 24-35 parts of fly ash; 15-25 parts of steel slag; 5-15 parts of bentonite; 4-10 parts of limestone tailing; 0.3-2.0 parts of water reducing agent; 0.5-2.5 parts of cellulose. The materials of slurry II are: 0.2-3.8 parts of short-cut fiber; 96-99 parts of sodium silicate solution; 0.8-4.8 parts of viscous polymers. This invention generates the double-liquid slurry preparation process including crushing-screening-milling-group mixing-grouped mixing at different speeds, the volume ratio of (Continued)

slurry I and II is 1:1-10:1 during grouting, and the slurry is injected into the shield void through the six-point position technology at the shield tail and 3+2+1 segment splicing synchronous grouting techniques.

20 Claims, 6 Drawing Sheets

(51) Int. Cl.

| | |
|---|---|
| ***C04B 14/28*** | (2006.01) |
| ***C04B 14/46*** | (2006.01) |
| ***C04B 16/06*** | (2006.01) |
| ***C04B 24/26*** | (2006.01) |
| ***C04B 24/38*** | (2006.01) |
| ***E21D 11/10*** | (2006.01) |
| *C04B 103/30* | (2006.01) |
| *C04B 111/00* | (2006.01) |
| *C04B 111/70* | (2006.01) |
| *C04B 111/74* | (2006.01) |

(52) U.S. Cl.
CPC ...... *C04B 14/4668* (2013.01); *C04B 16/0633* (2013.01); *C04B 24/2623* (2013.01); *C04B 24/2641* (2013.01); *C04B 24/383* (2013.01); *E21D 11/105* (2013.01); *C04B 2103/302* (2013.01); *C04B 2111/00146* (2013.01); *C04B 2111/70* (2013.01); *C04B 2111/74* (2013.01); *C04B 2201/50* (2013.01)

(72) Inventors: Qiguang Duan, Jiangsu (CN); Yuhong Diao, Shandong (CN); Jicheng Shu, Jiangsu (CN); Minglong Zhang, Shandong (CN); Shijiu Gu, Shandong (CN); Hongying Niu, Shandong (CN); Jingze Xu, Shandong (CN); Yuhang Zuo, Shandong (CN); Mingshuai Xi, Shandong (CN)

DOUBLE-LIQUID GROUTING SLURRY, ITS TECHNOLOGY AND APPLICATION FOR SUPER LARGE DIAMETER UNDERWATER SHIELD ENGINEERING UNDER HIGH WATER PRESSURE CONDITION

CROSS-REFERENCE TO RELATED APPLICATION

This application claims the priority benefit of China application no. 202111677537.8, filed on Dec. 31, 2021. The entirety of the above-mentioned patent application is hereby incorporated by reference and made a part of this specification.

TECHNICAL FIELD

This present invention relates to a double-liquid grouting slurry, its technology and application for super large diameter underwater shield engineering under high water pressure condition. Specifically, it involves a double-liquid grouting slurry, preparation process, grouting technology, and application with high anti-scouring rate under high-pressure dynamic water, high early strength, high toughness, good anti-permeability and good effect of preventing deformation of tube sheet. It belongs to the shield grouting technical fields of tunneling and underground engineering.

BACKGROUND

With continuous and high-speed development of transportation infrastructure and urban construction, large diameter shield construction method is becoming the mainstream way to build underwater tunnels and underground projects across rivers, seas, and lakes. After shield excavation, there exists a certain gap between the shield shell and the pipe sheet. When the shield shell is detached from the pipe sheet, the gap between shield shell and pipe sheet needs to be reinforced by grouting to prevent unfavorable phenomena such as bottom disturbance and pipe sheet uplift.

The current underwater shield tunnel back-fill grouting is divided into two main categories: single-liquid slurry and double-liquid slurry. The single-liquid slurry can be divided into inert slurry and hardenable slurry. The inert slurry is mainly composed of fly ash, sand, bentonite, water, and admixtures. However, because there is no composition of cement, its slurry has lower early and late strength and longer setting time, which is not beneficial to the stability of the underwater shield tunnel. The hardenable slurry is mainly composed of cement, fly ash, sand, bentonite, water, and admixture, which has certain initial and final strength, and it is one of the main methods used for back-fill grouting in China, but this slurry generally has a long initial setting time and it is easy to be washed away under higher water pressure, which does not meet the construction requirements of large-diameter underwater (cross-river, cross-sea, cross-lake, etc.) shield tunnels with high water pressure.

Double-liquid slurry, on the other hand, is composed of cement-based slurry and water glass solution, and its hardening time is controlled by the different volume ratios of cement-based slurry and water glass. Meanwhile, the initial setting time is short and the early strength is high, and the impermeability is good, the double-liquid slurry is a ideal grouting material for filling the gap behind the shield wall based on the grouting effect. Although there is a certain research basis for domestic shield grouting materials, it also lacks the effective double-liquid grouting slurry for super large diameter underwater shield engineering under high water pressure condition, and the related technology is still not mature. There are problems such as serious washout under high hydraulic pressure and dynamic water conditions, low retention rate in the muddy water environment, easy pipe plugging, poor filling effect, poor strength and toughness, and poor seepage resistance.

Based on the above current practical engineering problems, combining with the current problems of double-liquid slurry, it is necessary to study and develop a shield synchronous double-liquid grouting slurry with high anti-scouring rate under high-pressure dynamic water conditions, high retention rate in muddy water environment, not pipe plugging, good filling effect, high early strength, high toughness, good anti-seepage performance, and suitable for high water pressure and underwater (river water, seawater, etc.) weakened strata. At the same time, the realization of these good properties requires innovatively optimizing its formulation and preparation process, and innovatively developing double-liquid grouting techniques and application technologies for super large diameter underwater shield engineering under high water pressure condition.

SUMMARY

Super large diameter shield engineering means that the underwater shield construction will encounter more serious adverse geological impact, not only that, in the cross-river, cross-sea, and other underwater weakened soil strata, dynamic water with high hydraulic pressure, muddy water and other extremely adverse conditions are frequently encountered. In this situation, water inrush, sand gushing, collapse, stratum deformation and other engineering accidents occur frequently, once a similar accident, they will cause serious casualties to construction personnel, serious damage to shield machinery and equipment, and affect the construction progress seriously. Therefore, there are new high requirements for the double-liquid synchronous slurry especially in resisting high-pressure dynamic water, efficient filling effect in muddy water, cracking resistance ability, high toughness, etc. for super large diameter underwater shield engineering under high water pressure.

In response to this problem, this present invention provides a double-liquid grouting slurry for super large diameter underwater shield engineering under high water pressure condition, the double-liquid injection slurry has advantages of excellent resistance to high-pressure dynamic water, rapid chemical cementitious hardening, high filling rate in muddy water, high strength, cracking resistance and high toughness, strong anti-seepage, etc. through optimal screening of raw material composition and optimizing agent (water reducing agent, cellulose, viscous polymers). Meanwhile, the double-liquid slurry in this present invention can effectively solve the problems such as double-liquid pipe blocking and difficult cleaning. It can also prevent the pipe piece from floating effectively and maintain the overall stability of the underwater soil strata. It can be widely applied in double-liquid grouting projects for super large diameter underwater (cross-river, cross-sea, cross-lake, etc.) shield engineering under high water pressure and weakened soil strata.

The specific technical solution of the invention is as follows:

A double-liquid grouting slurry for super large diameter underwater shield engineering under high water pressure condition, comprising slurry I and slurry II, wherein slurry I comprises the following weight parts of raw materials:

35-45 parts of silicate cement clinker, 15-25 parts of granulated blast furnace slag, 24-35 parts of fly ash, 15-25 parts of steel slag, 5-15 parts of bentonite, 4-10 parts of limestone tailing powder, 0.3-2.0 parts of water reducing agent, 0.5-2.5 parts of cellulose, and an amount of water meets the w/b of 0.8:1-1.5:1; wherein the slurry II comprises the following weight parts of raw materials: 0.2-3.8 parts of short-cut fiber, 96-99 parts of sodium silicate solution, and 0.8-4.8 parts of viscous polymers.

Further, the high water pressure refers to that the water-bearing pressure is greater than or equal to 0.5 MPa, super large diameter generally refers to that shield diameter is greater than or equal to 14 m, and the underwater shield strata are generally water-rich sandy soil strata, water-rich silty clay strata, and other water-rich weakened strata.

Further, in slurry I, the water-binder ratio (w/b) is 0.8:1-1.5:1, the binder refers to the total mass of silicate cement clinker, granulated blast furnace slag, fly ash, steel slag, bentonite, and limestone tailing powder, the w/b is the mass ratio of water to the binder powder.

Further, in the application, a volume ratio of slurry I to slurry II is 1:1-10:1, in this range, anti-washout performance, filling rate and relatively short setting time of the slurry can be ensured. A volume ratio of slurry I to slurry II is preferably 3:1-10:1 based on the effects of rapid filling and reinforcement, and strength of slurry.

Further, a sieving residue of the silicate cement clinker through 80 μm sieve is not more than 4%. Silicate cement clinker is a high-quality hydraulic cementitious material, its hydration products are mainly hydrated calcium silicate gel (CSH gel), ettringite and other minerals, CSH gel is the main strength source of cement stone, the strength of cement clinker is high after hydration, it can be closely cemented with the sand layer, and the impermeability of reinforced sandy soil is improved.

Further, the density of the granulated blast furnace slag density is not less than 2.8 g/$cm^3$, the specific surface area of the granulated blast furnace slag is not less than 400 $m^2$/kg, the water content of the granulated blast furnace slag is not more than 1%; the fly ash is a secondary ash, the sieving residue of fly ash through 45 μm sieve is 12-20%, the water demand ratio of the fly ash is 95-100%, the water content of the fly ash is not more than 1%.

Further, the steel slag powder has a specific surface area of not less than 350 $m^2$/kg, a content of free calcium oxide of the steel slag powder is not more than 3%. If steel slag powder replaces silicate cement clinker in equal amounts, the hydration products of the cementitious material are consistent with those of silicate cement, the $Ca(OH)_2$ produced by cement promotes the dissociation of steel slag vitreous body, with the growth of hydration age, the hydration product $Ca(OH)_2$ is continuously consumed by steel slag powder, which is conducive to improve the later strength of slurry, and at the same time can reduce the cost.

Further, montmorillonite is the main mineral for the bentonite, its surface has many OH—, Si—O and other reactive groups, card house structures are generated in slurry I after hydration, it can improve the pumping stability of slurry I and reduce its bleeding rate. The bentonite is preferably as sodium-based bentonite.

Further, the calcium carbonate mass fraction of the limestone tailing powder is not less than 80%, and the alumina mass fraction is not higher than 2%. The main chemical composition of limestone tailings powder is $CaCO_3$, limestone tailings powder has certain hydration activity, and $CaCO_3$ has an accelerating effect on the hydration reaction of $C_3A$ and $C_4AF$. Not only that, the particle size of limestone tailing powder is smaller than that of cement, it can fill the voids in the transition zone of cement-based slurry and soil, making the cement-based slurry denser, reducing the porosity and pore diameter, improving the pore structures, thus improving strength, and reducing the material cost.

In the actual construction, the super large diameter underwater shield engineering under high water pressure condition will experience a variety of unexpected problems, if the unexpected problems are not solved in time, the residual slurry I in the transport pipe will eventually harden, resulting in pipe blocking. Therefore, a water-reducing agent is added to improve its fluidity, thus extend the setting time appropriately within a reasonable range and ensure the slurry is less likely to block pipe; the combination of water-reducing agent and cellulose can improve the dispersion of suspended particles in slurry I, and it also increases the anti-washout of slurry I, reduce the bleeding rate of slurry I, and at the same time increase the filling rate of slurry I in the muddy water environment.

Further, the water-reducing agent is naphthalene water-reducing agent or/and polycarboxylic acid water-reducing agent. If it is a mixture of naphthalene water-reducing agent and polycarboxylic acid water-reducing agent, the optimized mass ratio is 3:1-3:2.

Preferably, the cellulose is a hydroxypropylmethyl cellulose with a viscosity of 100,000.

Further, the short-cut fibers are basalt fibers or/and polypropylene fibers, preferably, it is a mixture of short-cut basalt fibers and short-cut polypropylene fibers in a 2:1-3:1 mass ratio.

Further, the diameter of the basalt fibers is 7-20 μm, the length of a monofilament of the basalt fiber is 5-20 mm, and the density of the basalt fiber is 2-3 g/$cm^3$, and the diameter of the polypropylene fibers is 9-30 μm, the length of a monofilament of the polypropylene fiber is 3-8 mm, the density of the polypropylene fiber is 1-2 g/$cm^3$.

Further, the sodium silicate solution has a preferred Baume degree of 35-40° Bé.

Further, the viscous polymer is at least one of acrylate polymer, ethylene vinyl acetate copolymer, and polyvinyl alcohol, an acrylate polymer has an average molecular weight greater than or equal to 2000, an ethylene vinyl acetate copolymer has an average molecular weight greater than or equal to 2000, the polyvinyl alcohol has an average molecular weight greater than or equal to 110,000. Preferably, the mass ratio of acrylate polymer, ethylene vinyl acetate copolymer, and polyvinyl alcohol is 1:1:1-1:2:1.

Acrylate polymer, ethylene-vinyl acetate copolymer, and polyvinyl alcohol can cross-link with the hydration products in slurry to generate a spatial three-dimensional network structure, these can fill the larger void/pore slurry in the stone body; acrylate polymer can enhance the waterproof penetration effect at the polymer-cement interface, ethylene-vinyl acetate copolymer can improve its interfacial adhesion and interface bonding strength; polyvinyl alcohol is soluble in water, film formation performance is good, and it can play a water-soluble adhesive thickening effect; viscous polymers can improve the fracture toughness and impermeability of the double-liquid slurry stone body behind the shield wall. In addition, the combination of viscous polymers and short-cut fibers can further improve the tensile/flexural strength and fracture toughness of the double-liquid slurry stone body, further reducing the number of harmful cracks in the stone body, and the reinforcement body tends to be more integral and less prone to rupture in local positions, which is more conducive to the control of shield pipe uplift and formation deformation.

The present invention also provides preparation process of double-liquid grouting slurry for super large diameter underwater shield engineering under high water pressure condition, it includes the following steps:

(1) silicate cement clinker, granulated blast furnace slag, steel slag, and limestone tailings being crushed respectively, then ball-milled until maximum particle size being less than 120 μm, and then being dried and placed at room temperature respectively, for later use, (2) the grounded silicate cement clinker powder and granulated blast furnace slag powder being mixed and stirred at 150-250 r/min for 60-80 s to obtain a homogeneous mixture I, (3) fly ash, steel slag powder, bentonite, and limestone tailing powder being mixed and stirred at 150-250 r/min for 60-80 s to obtain a homogeneous mixture II, (4) water-reducing agent being mixed with a first portion of water and being stirred at 350-450 r/min for 20-30 s to obtain an admixture I solution; cellulose being mixed with a second portion of water and stirred at 350-450 r/min for 20-30 s to obtain the admixture II solution, (5) the remaining water, the mixture I, and the mixture II being stirred at 450-550 r/min for 120-140 s to obtain mixture III, (6) the admixture I solution and the admixture II solution being added to the mixture III in step (5), being mixed and stirred at 450-550 r/min for 120-180 s to obtain slurry I, (7) viscous polymers being added to a sodium silicate solution and being stirred at 550-700 r/min for 120-150 s to obtain liquid mixture IV, (8) short-cut fibers being added to liquid mixture IV and being stirred at 550-700 r/min for 150-180 s to obtain slurry II, Further, the invention also provides the application of the double-liquid grouting slurry for super large diameter underwater shield engineering under high water pressure condition. Wherein the double-liquid grouting slurry is applied for underwater shield tunneling with subsurface water pressure is greater than or equal to 0.5 MPa, and diameter greater than or equal to 14 m, the double-liquid slurry has advantages of excellent resistance to high-pressure dynamic water, high filling rate in muddy water, high strength, cracking resistance and high toughness, strong anti-seepage, etc., which can solve problems of double-liquid blocking pipeline effectively and difficult to clean, meanwhile, it can prevent the pipe from floating effectively and maintain the overall stability of underwater strata to meet construction requirements.

Further, the double liquid slurry in this invention is suitable for high water pressure fine-medium-coarse sand strata, high water pressure clay strata, high water pressure silt sand strata, and other high water-pressure and weakened strata in cross-river, cross-sea, cross-lake, and other underwater shield tunnel projects.

This invention also provides the related synchronous double liquid grouting technique for super large diameter underwater shield engineering under high water-pressure condition, it includes a process of adding the above-mentioned double liquid slurry to a synchronous grouting system for synchronous grouting.

Further, the synchronous grouting system comprises 6 synchronous grouting units, each of the synchronous grouting unit comprises a double-liquid slurry delivery pipe, the double-liquid slurry delivery pipe is provided with a slurry I inlet and a scouring liquid inlet, the slurry I inlet and the scouring liquid inlet are connected with a slurry I delivery pipe and a scouring liquid delivery pipe respectively, the slurry I delivery pipe is connected with a slurry I storage tank, the scouring liquid delivery pipe is connected with scouring liquid storage tank; the slurry I delivery pipe is provided with a slurry II inlet, the slurry II inlet is connected to a slurry II delivery pipe, the slurry II delivery pipe is connected with a slurry II storage tank, and the slurry II delivery pipe has a first injection port at an outlet of the slurry II delivery pipe; the double-liquid slurry delivery pipe is equipped with a mixing and stirring pump that moves along the double-liquid slurry delivery pipe, and the mixing and stirring pump has an inlet port at a top, and the mixing and stirring pump has a discharge port on the same side as a discharge port of the double-liquid slurry delivery pipe, and a second slurry injection port is on the outlet port.

Further, the slurry I inlet and the scouring liquid inlet are positioned on both sides of the double-liquid slurry delivery pipe, and a distance between the slurry I inlet and the outlet of the double-liquid slurry delivery pipe is closer than a distance between the scouring liquid inlet and the outlet of double-liquid slurry delivery pipe.

Further, the outer diameter of the mixing and stirring pump is comparable in size to the inner diameter of the double liquid slurry transfer tube.

Further, the slurry I transfer pipe, the slurry II transfer pipe, and the scouring liquid transfer pipe are all equipped with transfer pumps.

Further, the double-liquid slurry delivery tube is positioned in the gap between the soil (or water) and the pipe sheet, it is used for filling the double-liquid slurry in the gap between the soil (or water) and the pipe sheet.

Further, each of the synchronous grouting unit is distributed around a circle evenly, when grouting, the slurry I and the slurry II are added into the slurry I storage tank and the slurry II storage tank of each of the synchronous grouting unit respectively, the slurry I and the slurry II are mixed in the mixing and stirring pump with the volume ratio of 1:1-10:1. a mixed double-liquid slurry flows out from six double-liquid slurry delivery pipes at the same time, and after grouting, the mixing and stirring pump is moved to the outlet of the double-liquid slurry delivery pipe, and the scouring liquid is pumped into the slurry one delivery pipe. with a grouting pressure being 0.5-0.9 MPa, and a grouting volume being controlled at 100-200 L/min.

Further, the volume ratio of slurry I to slurry II is preferably as 3:1-10:1.

Further, the invention develops a double-liquid grouting technology for the synchronous six-point position of the shield tail, which corresponds to the pipe piece 3+2+1 splicing mode with a good double-liquid grouting filling effect. Meanwhile, the grouting pressure is controlled at 0.5-0.9 MPa, the grouting volume is controlled as 100-200 L/min, and the grouting rate reaches 150-250% per ring.

The present invention has the following beneficial effects:

1. The excellent performance of the double-liquid slurry is obtained based on synergistic collocation and effect of the formulation of each raw material in this invention. Silicate cement clinker and blast furnace slag hydrates in the presence of water, hydrated calcium silicate gel, ettringite and other minerals are generated. The blast furnace slag optimizes the pore structure of cement-based slurry, it improves the impermeability, and more ettringites are generated. The $Ca(OH)_2$ content is reduced, the impermeability properties and durability have been improved. When mixture II reacts with mixture I, $Ca(OH)_2$ in mixture I will continuously promote the dissociation of steel slag powder in mixture II, and with the growth of hydration time, $Ca(OH)_2$ in hydration products is continuously consumed by steel slag powder, which not only improves the strength of slurry in the later stage but also further improves the resistance to seepage and erosion. On the other hand, because the chemical composition in mixture II tailing powder is $CaCO_3$, $CaCO_3$ has certain hydration activity, which is conducive to promoting the reaction in mixture I. Meanwhile, limestone tailing powder has smaller pores than the hydration products of mixture I, it can fill pores of hydration products of this mixture I, and it can make the slurry stone body denser and improves its strength. Further, the fly ash in mixture II changes the rheological properties and initial structure in the mixture I, so that the slurry can be more lubricious and its fluidity has been improved. Further, the particle filling effects and water absorption characteristics of bentonite in mixture II can reduce the porosity of slurry stone body, which can increase the filling retention rate in muddy and water environments, refine the pores in the hydration products, and play a better filling, waterproof and anti-seepage role.

2. The invention adds a composite optimizer in slurry I, it includes water-reducing agent and cellulose. The water-reducing agent can improve the slurry liquidity and ensure the long-term flow of slurry I in the pipe, which can make the setting time of slurry I be within a reasonable range, and it can prevent problems of pipe blocking, difficult to clean and other difficulties. The reasonable combination of water-reducing agent and cellulose can not only improve pumpability of slurry I, but also enhance the resistance of slurry I to high-pressure dynamic water scouring in weakened strata, and at the same time it can increase the stone rate and retention rate of slurry I in muddy water environments. The above reasonable combination can make the double-liquid slurry wrapped evenly around the pipe piece. The pumping fluidity, anti-washout in dynamic water, stone rate, and gelation time of slurry I can meet the shield construction requirements.

3. In cross-river, cross-sea, cross-lake, and other high water-pressure super large diameter underwater shield double-liquid grouting process, the double-liquid slurry stone body is brittle, it is urgent to improve toughness, anti-cracking, anti-deformation, anti-seepage. Slurry II is based on sodium silicate solution, short-cut basalt fiber or polypropylene fiber, or a mixture of basalt fiber and polypropylene fiber and viscous polymer are added. The above optimization can not only make the double-liquid slurry quickly harden, retain and fill, improve the tensile/flexural/bending strength and fracture toughness of the filled body, but also improve the anti-permeability performance of the filled body so that the grouted strata tend to be integral and not easy to rupture locally.

4. For high water-pressure super large diameter submerged shield tunnel, if the slurry cannot fill the shield gap in time, it will easily lead to floating of shield tube and piece and significant deformation of soil layer. The double-liquid slurry of this invention has the characteristics of good pumping fluidity, strong anti-washout against dynamic water, high filling rate in muddy water environment, high strength, high toughness against cracking, strong anti-permeability, etc., which can prevent the tube piece from floating effectively, filling efficiently and reinforcing effectively. It is verified by tests that the retention rate of double-liquid slurry against high-pressure dynamic water scouring is not less than 95%, the filling rate of high-pressure in muddy water environment is not less than 98%, the 28 d compressive strength of stone body is up to 36 MPa, the gelation time of double-liquid slurry is within 3 min; water-land strength ratio of the double-liquid slurry stone body is not less than 90%.

5. This invention optimizes the preparation process of crushing-grinding-screening-grouping mixing-classification adjustment; it optimizes the grading and graded rate mixing processes, and mixing processes of low-rate graded mixing and high-speed graded mixing are adopted. The volume ratio of slurry I to slurry II is controlled as 1:1-10:1, the double-liquid shield system mixing process is generated. Based on the above, the preparation process of shield double-liquid slurry is invented, it has been verified by tests and it ensures the optimal working performance of this double-liquid slurry under the same conditions.

6. The invention has developed a six-point double-liquid grouting process at the end of the shield, which corresponds to the 3+2+1 splicing mode of the tube piece, the synchronous double-liquid slurry distributes around the tube piece completely and uniformly; the grouting pressure is 0.5-0.9 MPa, the grouting volume is controlled as 100-200 L/min, and the grouting rate per ring reaches 150-250%. The above high hydraulic pressure super large diameter underwater shield double-liquid grouting technology is based on engineering application problems, which ensures underwater shield machine accomplish grouting and washing process efficiently and makes the double-liquid slurry more effective in filling, reinforcing, preventing floating of pipe sheet, and controlling strata deformation.

7. The synchronous double-liquid slurry, its supporting preparation process and grouting technology can be applied to underwater shield projects with high water pressure (≥0.5 MPa) and super large diameters (≥14 m) across rivers, seas, lakes, etc. The applicable strata include high water-pressure fine-medium-coarse sand strata, cohesive soil strata, silty sand strata, and many other weakened strata with high water-pressure, and the engineering applicability is wide. The invention can efficiently fill and reinforce, prevent seepage and floating of pipe piece, and ensure stability of weakened soil strata, and it has good application effects.

BRIEF DESCRIPTION OF THE DRAWINGS

To illustrate the entire grouting process of the synchronous grouting system, the following brief Figure illustrations of the applied technology are provided below, and the drawings shown below are only examples, all in further explanation of the present application. Unless otherwise indicated herein, the technical and scientific terms used herein have the same meaning as commonly understood by those skilled in the field.

Figure 1:
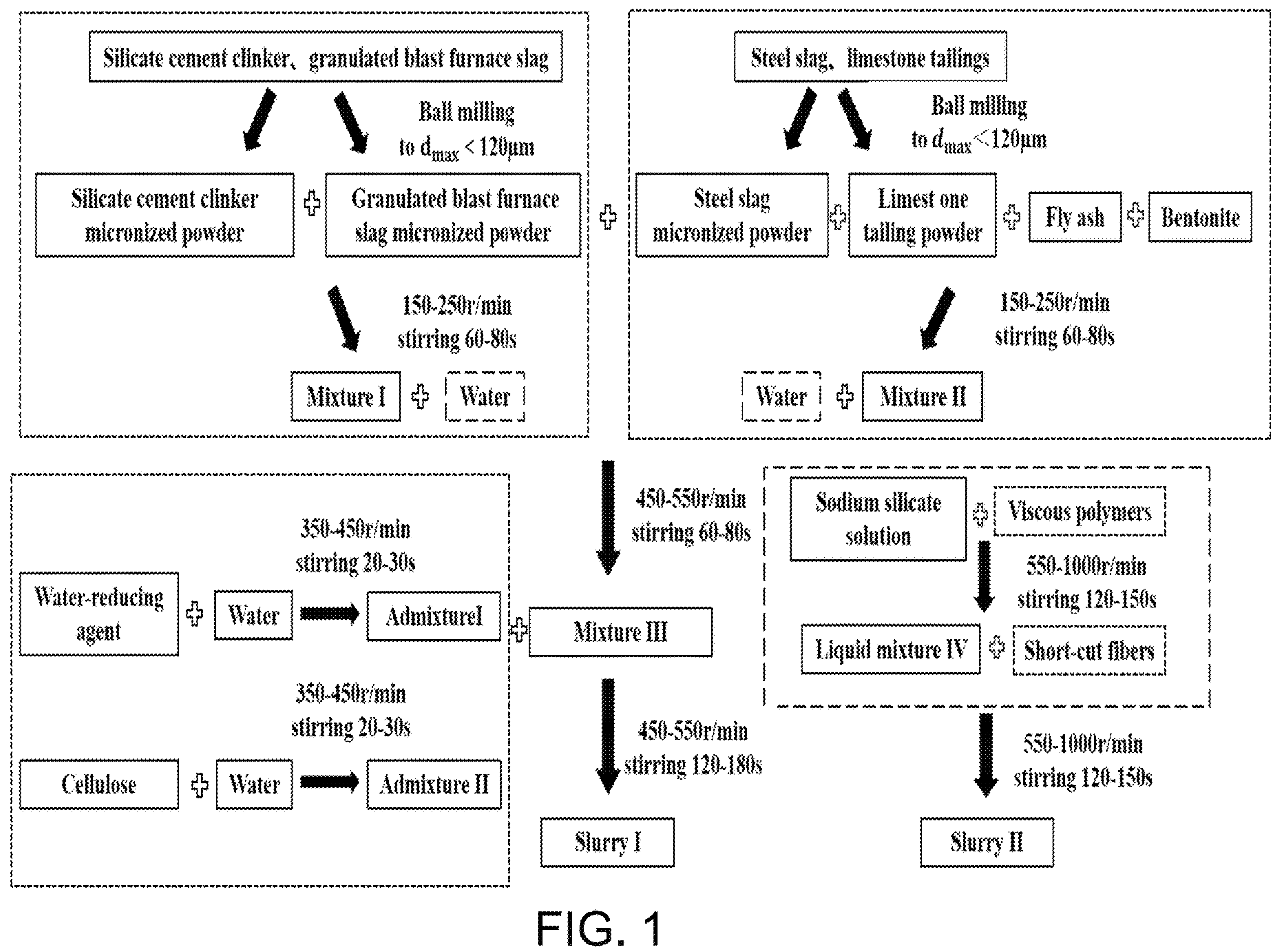
FIG. 1 shows a schematic diagram of the preparation process of double-liquid grouting slurry for high hydraulic pressure super large diameter underwater shield tunnel.

In the Figures, 1 represents slurry I delivery pipe, 2 represents slurry II delivery pipe, 3 represents scouring fluid delivery pipe, 4 represents double liquid slurry delivery pipe, 5 represents transfer pump, 6 represents slurry I storage tank, 7 represents mixing and stirring pump, 8 represents first grouting port, 9 represents second grouting port, 10 represents slurry I inlet, 11 represents scouring fluid inlet, 12 represents slurry II storage tank, 13 represents scouring fluid storage tank, 14 represents pipe sheet, 15 represents soil body, 16 represents slurry, 17 represents shield shell.

DETAILED DESCRIPTION OF THE EMBODIMENTS

To make clear the purpose, technical solutions, and the embodiment advantages of this invention, the embodiments of this invention are described with accompanying drawings in further details. It should be noted that the following detailed descriptions are exemplary and are intended to provide further illustration of this application. Unless otherwise indicated, all technical and scientific terms used herein have the same meaning as commonly understood by a person of ordinary skill in the field.

In the following embodiments, the silicate cement clinker used is crushed and ball-milled to meet a sieve allowance of ≤4% on an 80 μm square hole sieve.

In the following embodiments, the granulated blast furnace slag used is crushed and ball-milled to meet a density of ≥2.8 g/cm$^3$, a specific surface area of the granulated blast furnace slag≥400 m$^2$/kg, and water content of the granulated blast furnace slag ≤1%.

In the following embodiments, the fly ash is a secondary fly ash, the fly ash satisfying a 45 μm sieve margin between 12-20%; a water demand ratio of the fly ash between 95% and 100%; and a water content of the fly ash≤1%.

In the following embodiments, the used steel slag powder meets the specific surface area≥350 m$^2$/kg and the content of free calcium oxide of the steel powder≤3%.

In the following embodiments, the bentonite used is a sodium-based bentonite.

In the following embodiments, the limestone tailing powder used satisfies a calcium carbonate mass fraction≥80% and an alumina mass fraction of aluminum oxide in the limestone tailing powder≤2%.

In the following embodiments, the cellulose used is a hydroxypropylmethyl cellulose with a viscosity of 100,000.

In the following embodiments, the basalt fibers used meet a short-cut diameter of 7-20 μm, a length of a monofilament of the basalt fiber 5-20 mm, and a density of the basalt fiber 2.7 g/cm$^3$, while the polypropylene fibers meet a short-cut diameter of 9-30 μm, a length of a monofilament of the polypropylene fiber 3-8 mm, and a density of the polypropylene 1.18 g/cm$^3$.

In the following embodiments, the viscous polymers used are at least one of acrylate polymers, ethylene vinyl acetate copolymers, and polyvinyl alcohol.

In the following embodiments, the sodium silicate solution used has a Baume degree of 35-40° Bé, which is prepared from water glass and water.

Implementation Example 1

A double-liquid grouting slurry for super large diameter underwater shield engineering under high water pressure condition, comprising slurry I and slurry II, wherein slurry I comprises the following raw materials in weight: 42 parts of silicate cement clinker, 22 parts of granulated blast furnace slag, 30 parts of fly ash, 21 parts of steel slag, 8 parts of bentonite, 7 parts of limestone tailing powder, 1.0 part of water reducing agent, 1.2 parts of cellulose, and the amount of water meets the w/b of 1:1. wherein the slurry II comprises the following raw materials in weight: 3.0 parts of short-cut fiber, 98 parts of sodium silicate solution, 3.5 parts of viscous polymer. Wherein the water reducing agent is a mixture of naphthalene water reducing agent and polycarboxylic acid water reducing agent with the mass ratio of 3:2; wherein the short-cut fiber is a mixture of short-cut basalt fiber and short-cut polypropylene fiber with the mass ratio of 2:1; wherein the viscous polymer is a mixture of acrylate polymer, ethylene vinyl acetate copolymer and polyvinyl alcohol with the mass ratio of 1:1.5:1. The preparation process of the synchronous double-liquid slurry is as follows:

(1) Silicate cement clinker, granulated blast furnace slag, steel slag, and limestone tailings being crushed respectively, then ball-milled until maximum particle sizes being less than 120 μm, and then being dried and placed at room temperature respectively for later use.

(2) The grounded silicate cement clinker powder and granulated blast furnace slag powder being mixed and stirred at 150-250 r/min for 60-80 s to obtain a homogeneous mixture I.

(3) Fly ash, steel slag powder, bentonite, and limestone tailing powder being mixed and stirred at 150-250 r/min for 60-80 s to obtain a homogeneous mixture II.

(4) The water-reducing agent being mixed with a first portion of water and being stirred at 350-450 r/min for 20-30 s to obtain an admixture I solution; cellulose being mixed with a second portion of water and stirred at 350-450 r/min for 20-30 s to obtain the admixture II solution.

(5) The remaining water, the mixture I and the mixture II being stirred at 450-550 r/min for 120-140 s to obtain mixture III.

(6) The admixture I solution and the admixture II solution being added to the mixture III of step (5), being mixed and stirred at 450-550 r/min for 120-180 s to obtain slurry I.

(7) Viscous polymers being added to a sodium silicate solution and being stirred at 550-700 r/min for 120-150 s to obtain liquid mixture IV.

(8) Short-cut fibers being added to liquid mixture IV and being stirred at 550-700 r/min for 150-180 s to obtain slurry II.

When the slurry I is mixed with the slurry II, chemical gelling reaction can be achieved in a very short time. The chemical gelling time of the slurry I and the slurry II after mixing is verified by the pouring cup method with different volume ratios, and the results are shown in Table 1.

The method of pouring cup method is as follows: a certain amount of slurry I and slurry II are placed in two beakers respectively, the two beakers are poured repeatedly and alternately until the beaker tilts 45° and the double-liquid slurry cannot flow. The time used is the double-liquid gelling time.

TABLE 1

| | Slurry 1:Slurry 2 (volume ratio) | | | | |
|---|---|---|---|---|---|
| | 1:1 | 3:1 | 5:1 | 8:1 | 10:1 |
| Double liquid gelling time (s) | 66 | 47 | 24 | 18 | 13 |

As can be seen from above table 1, when the volume ratio of slurry I to slurry II is within the range of 1:1-10:1, there is a relatively good double-liquid gelling time, and the larger the slurry I proportion, the shorter double-liquid gelling time.

The double-liquid slurry with different volume ratios is poured into the mold with sizes of 40×40×160 mm for molding process, and the samples are obtained. The samples are cured at 20±2° C. and 98% humidity. Then, according to GBT17671-1999 "Cement mortar Strength Inspection Method (ISO method)" test method, the 3 d and 28 d flexural and compressive strengths are determined, results are shown in Table 2.

TABLE 2

| | Compressive strength (MPa) | | Flexural strength (MPa) | |
|---|---|---|---|---|
| (volume ratio) | 3 d | 28 d | 3 d | 28 d |
| 1:1 | 13 | 21 | 1.2 | 2.3 |
| 3:1 | 16 | 26.7 | 1.6 | 3.1 |
| 5:1 | 21.6 | 36 | 3.4 | 5.6 |
| 8:1 | 18 | 28 | 2.2 | 3.6 |
| 10:1 | 16 | 27 | 2.3 | 3.9 |

It can be seen from table 2 that when the volume ratio of slurry I to slurry II reaches 5:1, strength is the maximum. When the volume ratio is 1:1, strength is the minimum, and the strength of the rest volume ratio is moderate. Considering that the slurry needs to fill the gap quickly and the strength needs to reach the ideal state timely, the optimal volume ratio of slurry I to slurry II is controlled as 3:1-10:1.

Taking the volume ratio 5:1 of slurry I to slurry II as example, its bleeding rate, fluidity, chemical gelling time, final setting time, compressive strength (MPa) on land, compressive strength (MPa) in water, water-land strength ratio (%), flexural strength (MPa), scour retention rate against high-pressure dynamic water (%), and filling rate in high-pressure muddy water environment (%) are tested. The methods are as follows:

Test method of bleeding rate: According to the test method of GBT 25182-2010 "Prestressed Hole Grouting Agent", 90±2 mL slurry I, and slurry is injected into 100 m L measuring cylinder, which is sealing with plastic wrap, it is placed on the horizontal surface for 2 h, the height of the surface of the segregation $a_2$ and the slurry $a_1$ are read. The bleeding rate of slurry 2 h is calculated by the following formula:

$$B(\text{Rate of bleeding}) = \frac{a_2 - a_1}{a_2} \times 100\%$$

Test method of fluidity: According to the test method of GBT50488-2015 "Technical Specifications for the Application of Cement Based Grouting Materials", the metal truncated cone circular mold with an upper diameter of 70 mm, a high diameter of 60 mm and the lower diameter of 100 mm is placed in the center of the glass plate of 500×500 mm. The slurry is quickly filled with the truncated cone circular mold after stirring, and the truncated cone circular mold is slowly lifted. The slurry flows freely to a stop without disturbance. A steel ruler was used to measure the maximum diffusion diameter of the bottom surface and its vertical diameter, and the average value was taken as the fluidity of the slurry.

Test method of double-liquid gelling time: Referring to the test method of pouring cup, a certain amount of slurry I and slurry II are placed in two beakers respectively, the two beakers are poured repeatedly and alternately until the beaker tilts 45° and the slurry cannot flow. The time used is chemical gelling time.

Setting time test method: Referring to GBT1346-2011 "standard amount of cement water, setting time, stability test method", vicat apparatus is used for testing initial and final setting times. The prepared slurry is filled with standard test mold, a glass plate is under the test mold; when the initial setting needle drops freely to 4±1 mm distance from the ground glass plate, the slurry reaches the initial setting state. After the initial setting time is determined, the test mold is removed from the glass plate, and the sample is turned over 180°. The sample is placed under the standard vicat apparatus equipped with the final setting needle, and the final setting needle is adjusted to make it just in contact with the surface of the material so that the final setting needle drops freely and slowly. When the final setting test needle sinks into the stone body within the sinking depth of 0.5 mm, it reaches the final setting state, the period from the beginning of the slurry preparation to the final setting state is the final setting time.

Test method of compressive strength on land: Referring to the test method of DLT5117-2000 "Test Rules for Underwater Undispersed Concrete", the test adopts a cubic triple mold with a test size of 70.7×70.7×70.7 mm. Slurry I and slurry II with different mixing ratios are poured into the cube triple mold uniformly. The test mold is placed in the standard curing box for curing. When it reaches the corresponding age, the compressive strength is measured, and $P_L$ is obtained.

Test method of compressive strength in water: Referring to the test method of DLT5117-2000 "Test Rules for Undispersed Concrete under Water", the test adopts a cubic triple mold with a size of 70.7×70.7×70.7 mm. Slurry I and slurry II with different mixing ratios are poured into the cube triple mold uniformly. The test mold is placed in a water tank at (20±3) ° C. for curing. After reaching the corresponding age, the sample was removed from the water and compressive strength tests are conducted to obtain Pw.

The ratio of water and land strengths represents the anti-washout performance of grouting materials. The formula for calculating the ratio is as follows:

$$S = \frac{P_L}{P_W} \times 100\%$$

Test method of flexural strength: Referring to the test method of GBT17671-1999 "Cement mortar Strength test Method (ISO method)", the test mold adopts a metal triple mold of 40×40×160 mm. The mixed slurry is poured into the test mold, and the mold is removed after being placed at room temperature for 2 d, and then the standard specimens are placed in curing box for curing. The specimens are taken out for flexural test after 3 d and 28 d.

Test method of retention against high-pressure dynamic water: The double slurry dynamic water scouring test is carried out, and the double slurry is prepared with different proportions, w/b, volume ratio and other variables. Based on the actual construction situation of shield grouting engineering, the volume ratio is selected as 1:1-10:1. When the two liquids contacts for 1 min, they are put into the dynamic water flow, and the dynamic water scouring time is set as 10 min. The hydrodynamic pressure is 0.5-0.9 MPa. The samples m0 and mi are measured respectively, where m0 is the remaining mass of the sample in the static water environment, mi(i=1, 2, 3 . . . ) is the residual mass of the sample under a hydraulic and hydrodynamic condition.

The retention rate of sample represents the resistance ability to high-pressure dynamic water, the calculation formula for the sample retention rate is as follows:

$$P = \frac{m_i}{m_0}$$

Test method of filling rate in the high-pressure muddy water environment: Model test device is used for testing. The size of model test device is 1.2×0.8×0.8 m, and the test chamber is equipped with a jack at the top, its inside contains a shield shell, segment, and mud-water stratum to simulate the real high-pressure mud-water environment. The double-liquid slurry is prepared with different proportions, w/b, volume ratio, and other variables. The shield shell adopts the forward type, the double-liquid slurry fills the shield void during advancing the design time of the shield shell for a ring-width segment. After 24 hours, the stone body is removed and the volume V1 of the stone body is calculated, and the volume V2 between the ring of tubes and the shield shell is further calculated.

The filling rate represents the filling ability of grouting slurry in a muddy water environment. Calculation formula of filling rate is as follows:

$$D = \frac{V_1}{V_2};$$

The results are shown in Table 3:

TABLE 3

| Slurry I-bleeding rate (%) | Slurry I fluidity (cm) | Slurry I setting time (h) | Double slurry gelling time (s) | Land compressive strength (MPa) 3 d | Land compressive strength (MPa) 28 d | Compressive strength in water (MPa) 3 d | Compressive strength in water (MPa) 28 d | Water-land intensity ratio (%) |
|---|---|---|---|---|---|---|---|---|
| 0.7 | 29.6 | ≥36 | 24 | 21.6 | 36 | 21 | 35.1 | ≥97 |

| Flexural strength (MPa) 3 d | Flexural strength (MPa) 28 d | Sample retention rate (%) | Filling rate (%) |
|---|---|---|---|
| 3.4 | 5.6 | ≥99 | ≥99 |

Implementation Example 2

A double-liquid grouting slurry for super large diameter underwater shield engineering under high water pressure condition, comprising slurry I and slurry II, wherein the water reducing agent is polycarboxylic acid water reducing agent, the cellulose is hydroxypropyl methylcellulose, the short-cut fiber is short-cut basalt fiber, and the viscous polymer is acrylate polymer, the other is the same as Implementation Example 1.

The preparation process of the double-liquid grouting slurry is the same as Implementation Example 1.

Slurry I and slurry II are mixed at the volume ratio of 5:1, and the performance of the mixed double slurry was tested according to the method of Implementation Example 1, and the results are shown in Table 4:

TABLE 4

| Slurry I-bleeding rate (%) | Slurry I fluidity (cm) | Slurry I setting time (h) | Double slurry gelling time (s) | Land compressive strength (MPa) 3 d | Land compressive strength (MPa) 28 d | Compressive strength in water (MPa) 3 d | Compressive strength in water (MPa) 28 d | Water-land intensity ratio (%) |
|---|---|---|---|---|---|---|---|---|
| 1.6 | 27.6 | ≥30 | 27 | 18.8 | 31.4 | 17.9 | 29.8 | ≥95 |

| Flexural strength (MPa) 3 d | Flexural strength (MPa) 28 d | Sample retention rate (%) | Filling rate (%) |
|---|---|---|---|
| 2.7 | 4.5 | ≥97 | ≥98 |

Implementation Example 3

A double-liquid grouting slurry for super large diameter underwater shield engineering under high water pressure condition, comprising slurry I and slurry II, wherein the water reducing agent is naphthalene water reducing agent, cellulose is hydroxypropyl methylcellulose, cut fiber is cut polypropylene fiber, and the viscous polymer is ethylene-vinyl acetate copolymer, the other is the same as Implementation Example 1.

The preparation process of the double-liquid injection slurry is the same as Implementation Example 1.

Slurry I and slurry II are mixed at a volume ratio of 5:1, and the performance of the mixed double slurry was tested according to the method of Implementation Example 1, and the results are shown in Table 5:

TABLE 5

| Slurry I-bleeding rate (%) | Slurry I fluidity (cm) | Slurry I setting time (h) | Double slurry gelling time (s) | Land compressive strength (MPa) | | Compressive strength in water (MPa) | | Water-land intensity ratio (%) |
|---|---|---|---|---|---|---|---|---|
| | | | | 3 d | 28 d | 3 d | 28 d | |
| 1.5 | 27.3 | ≥30 | 26 | 18.2 | 30.3 | 17.3 | 28.8 | ≥95 |

| Flexural strength (MPa) | | Sample retention rate (%) | Filling rate (%) |
|---|---|---|---|
| 3 d | 28 d | ≥97 | ≥98 |
| 2.6 | 4.3 | | |

Implementation Example 4

A double-liquid grouting slurry for super large diameter underwater shield engineering under high water pressure condition, comprising slurry I and slurry II, it is the same as in Implementation Example 1. The preparation process of this double-liquid slurry includes: silicate cement clinker, granulated blast furnace slag powder, fly ash, bentonite, limestone tailing powder, and steel slag powder are added sequentially into the mixing pot, being stirred at 200 r/min for 2 mins, water reducing agent and cellulose are added during the mixing process, and finally, water is put into the mixing pot, being mixed evenly at 200 r/min for 10 minutes to get slurry I; the preparation of slurry II is the same as Implementation Example 1.

Slurry I and slurry II are mixing at the volume ratio of 5:1, the performance of the mixed double slurry is tested according to the method of Implementation Example 1, and the results are shown in Table 6

TABLE 6

| Slurry I-bleeding rate (%) | Slurry I fluidity (cm) | Slurry I setting time (h) | Double slurry gelling time (s) | Land compressive strength (MPa) | | Compressive strength in water (MPa)) | | Water-land intensity ratio (%) |
|---|---|---|---|---|---|---|---|---|
| | | | | 3 d | 28 d | 3d | 28 d | |
| 2.3 | 26.6 | ≥26 | 30 | 17.7 | 27.2 | 16.1 | 25 | ≥91 |

| Flexural strength (MPa) | | Sample retention rate (%) | Filling rate (%) |
|---|---|---|---|
| 3 d | 28 d | ≥96 | ≥97 |
| 2 | 3.4 | | |

Implementation Example 5

A double-liquid grouting slurry for super large diameter underwater shield engineering under high water pressure condition, comprising slurry I and slurry II, wherein slurry I is made up of the following raw materials in weight: 35 parts of silicate cement clinker; 15 parts of granulated blast furnace slag; 24 parts of fly ash; 15 parts of steel slag; 5 parts of bentonite; 4 parts of limestone tailings; 0.3 parts of water reducing agent; 0.5 parts of cellulose; w/b of 1:1. Wherein, water reducing agent is the same as Implementation Example 1, and slurry II is the same as Implementation Example 1.

The preparation process of the double-liquid slurry is the same as in Implementation Example 1.

Slurry I and slurry II are mixing at the volume ratio of 5:1, and the performance of the mixed double slurry is tested according to the method of Implementation Example 1, and the results are shown in Table 7.

TABLE 7

| Slurry I-bleeding rate (%) | Slurry I fluidity (cm) | Slurry I time (h) setting | Double slurry gelling time (s) | Land compressive strength (MPa) | | Compressive strengthin water (MPa) | | Water-land intensity ratio (%) |
|---|---|---|---|---|---|---|---|---|
| | | | | 3 d | 28 d | 3 d | 28 d | |
| 3.5 | 25.7 | ≥18 | 29 | 13.5 | 20.8 | 12.2 | 18.7 | ≥90 |

| Flexural strength (MPa) | | Sample retention rate (%) | Filling rate (%) |
|---|---|---|---|
| 3d | 28 d | ≥96 | ≥96 |
| 1.2 | 2.2 | | |

Implementation Example 6

A double-liquid grouting slurry for super large diameter underwater shield engineering under high water pressure condition, comprising slurry I and slurry II, wherein slurry I is made up of the following raw materials in weight: 45 parts of silicate cement clinker; 25 parts of granulated blast furnace slag; 35 parts of fly ash; 25 parts of steel slag; 15 parts of bentonite; 10 parts of limestone tailing powder; 2 parts of water reducing agent; 2.5 parts of cellulose; w/b of 1:1. Wherein, the water-reducing agent is the same as Implementation Example 1, slurry II is the same as Implementation Example 1.

The preparation process of the double-liquid slurry is the same as in Implementation Example 1.

Slurry I and slurry II are mixed at the volume ratio of 5:1, and the performance of the mixed double slurry is tested according to the method of Implementation Example 1, and the results are shown in Table 8.

TABLE 8

| Slurry I-bleeding rate (%) | Slurry I fluidity (cm) | Slurry I setting time (h) | Double slurry gelling time (s) | Land compressive strength (MPa) | | Compressive strength in water (MPa) | | Water-land intensity ratio (%) |
|---|---|---|---|---|---|---|---|---|
| | | | | 3 d | 28 d | 3 d | 28 d | |
| 1.4 | 28.2 | ≥30 | 27 | 19.4 | 32.7 | 18.5 | 31.1 | ≥95 |

| Flexural strength (MPa) | | Sample retention rate (%) | Filling rate (%) |
|---|---|---|---|
| 3 d | 28 d | ≥98 | ≥98 |
| 3.1 | 5.1 | | |

Implementation Example 7

A double-liquid grouting slurry for super large diameter underwater shield engineering under high water pressure condition, comprising slurry I and slurry II, wherein slurry I is made up of the following raw materials in weight: 42 parts of silicate cement clinker; 22 parts of granulated blast furnace slag; 30 parts of fly ash; 21 parts of steel slag; 8 parts of bentonite; 7 parts of limestone tailings; 1 part of water reducing agent; 1.2 parts of cellulose; w/b of 1.5:1. Wherein the slurry II is made up of the following raw materials in weight: 3 parts of short-cut fiber; 1.5 parts of viscous polymers; 99 parts of sodium silicate solution. Wherein, the water-reducing agent and cellulose are the same as Implementation Example 1. The viscous polymer is polyvinyl alcohol.

The preparation process of the double-liquid grouting slurry is the same as that of Implementation Example 1. Slurry I and slurry II are mixing at the volume ratio of 3:1, and the performance of the mixed double-slurry is tested according to the method of Implementation Example 1, and the results are shown in Table 9.

TABLE 9

| Slurry I-bleeding rate (%) | Slurry I fluidity (cm) | Slurry I setting time (h) | Double slurry gelling time (s) | Land compressive strength (MPa) 3 d | Land compressive strength (MPa) 28 d | Compressive strength in water (MPa) 3 d | Compressive strength in water (MPa) 28 d | Water-land intensity ratio (%) |
|---|---|---|---|---|---|---|---|---|
| 4.2 | 28.2 | ≥30 | 27 | 16.8 | 24 | 15.7 | 22.4 | ≥93 |

| Flexural strength (MPa) 3 d | Flexural strength (MPa) 28 d | Sample retention rate (%) | Filling rate (%) |
|---|---|---|---|
| 1.8 | 3.5 | ≥95 | ≥95 |

Implementation Example 8

A double-liquid grouting slurry for super large diameter underwater shield engineering under high water pressure condition, comprising slurry I and slurry II, wherein slurry I is made up of the following raw materials in weight: 42 parts of silicate cement clinker; 22 parts of granulated blast furnace slag; 30 parts of fly ash; 21 parts of steel slag; 8 parts of bentonite; 7 parts of limestone tailings; 1 part of water reducing agent; 1.2 parts of cellulose; the w/b of 0.8:1. Wherein the slurry II is made up of the following raw material in weight: 3 parts of short-cut fiber; 1.5 parts of viscous polymers; 96 parts of sodium silicate solution. Wherein, the water-reducing agent and cellulose are the same as Implementation Example 1. Wherein, the viscous polymer is polyvinyl alcohol.

The preparation process of the double-liquid grouting slurry is the same as in Implementation Example 1. Slurry I and slurry II are mixed at the volume ratio of 10:1, and the performance of the mixed double-slurry is tested according to the method of Implementation Example 1, and the results are shown in Table 10.

TABLE 10

| Slurry I-bleeding rate (%) | Slurry I fluidity (cm) | Slurry I setting time (h) | Double slurry gelling time (s) | Land compressive strength (MPa) 3 d | Land compressive strength (MPa) 28 d | Compressive strength in water (MPa) 3 d | Compressive strength in water (MPa) 28 d | Water-intensity ratio (%) land |
|---|---|---|---|---|---|---|---|---|
| 1 | 27 | ≥28 | 26 | 17.4 | 29 | 16.6 | 27.6 | ≥95 |

| Flexural strength (MPa) 3 d | Flexural strength (MPa) 28 d | Sample retention rate (%) | Filling rate (%) |
|---|---|---|---|
| 2.4 | 4.1 | ≥98 | ≥98 |

Contrast Example 1

A double-liquid slurry for super large diameter underwater shield engineering under high water pressure condition is prepared according to the formulation and method of Implementation Example 1, the difference is that: slurry I is made up of the following raw materials in weight parts of: 42 parts of silicate cement clinker; 30 parts of fly ash; 8 parts of bentonite; 1 part of water-reducing agent; and the w/b of 1:1.

Slurry I and slurry II are mixed at the volume ratio of 5:1, and the performance of the mixed double slurry is tested according to the preparation process of Implementation Example 1, and the results are shown in Table 11.

TABLE 11

| Slurry I-bleeding rate (%) | Slurry I fluidity (cm) | Slurry I setting time (h) | Double slurry gelling time (s) | Land compressive strength (MPa) 3 d | Land compressive strength (MPa) 28 d | Compressive strength in water (MPa) 3 d | Compressive strength in water (MPa) 28 d | Water-land intensity ratio (%) |
|---|---|---|---|---|---|---|---|---|
| 13.3 | 23 | ≥24 | 30 | 10.2 | 17 | 8.8 | 14.7 | ≥86 |

| Flexural strength (MPa) 3 d | Flexural strength (MPa) 28 d | Sample retention rate (%) | Filling rate (%) |
|---|---|---|---|
| 0.7 | 1.8 | ≥85 | ≥85 |

Contrast Example 2

A double-liquid grouting slurry for super large diameter underwater shield engineering under high water pressure condition is prepared according to the formulation and method of Implementation Example 1, the difference is that: slurry I do not contain cellulose, and slurry II do not contain short-cut fibers and viscous polymers.

Slurry I and slurry II are mixed at the volume ratio of 5:1, and the performance of the mixed double slurry is tested according to the preparation process of Implementation Example 1, and the results are shown in Table 12.

TABLE 12

| Slurry I-bleeding rate (%) | Slurry I fluidity (cm) | Slurry I setting time (h) | Double slurry gelling time (s) | Land compressive strength (MPa) 3 d | Land compressive strength (MPa) 28 d | Compressive strengthin water (MPa) 3 d | Compressive strengthin water (MPa) 28 d | Water-land intensity ratio (%) |
|---|---|---|---|---|---|---|---|---|
| 7.2 | 23.7 | ≥24 | 30 | 14.9 | 24.8 | 14 | 23 | ≥93 |

| Flexural strength (MPa) 3 d | Flexural strength (MPa) 28 d | Sample retention rate (%) | Filling rate (%) |
|---|---|---|---|
| 1.3 | 2.9 | ≥90 | ≥92 |

Application Examples

Figure 2:
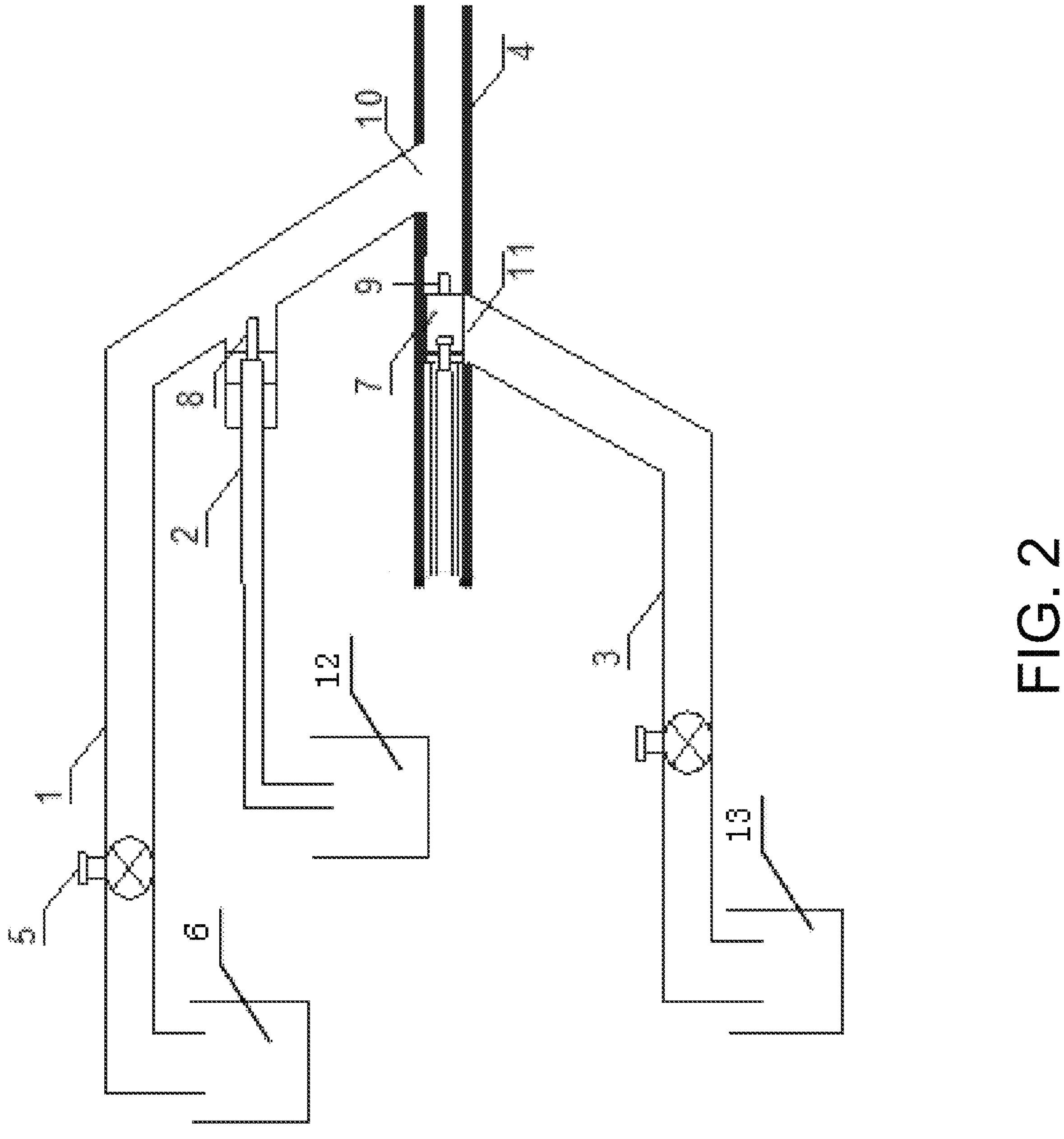
FIG. 2 shows a schematic diagram of the structure of the synchronous grouting unit of the underwater shield tunnel before grouting.
Figure 3:
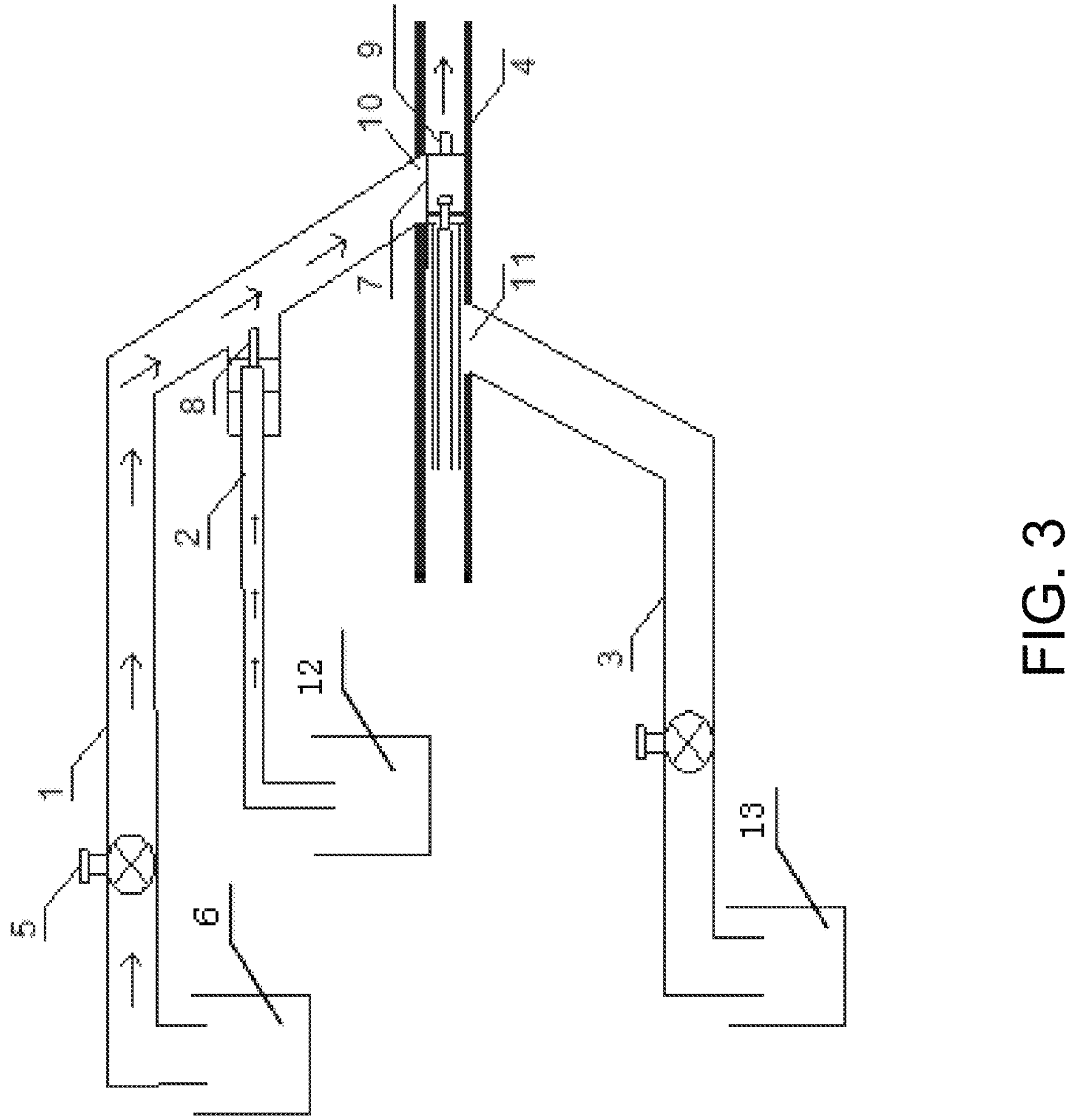
FIG. 3 shows the structure of the synchronous grouting unit in the underwater shield tunnel during grouting.
Figure 5:
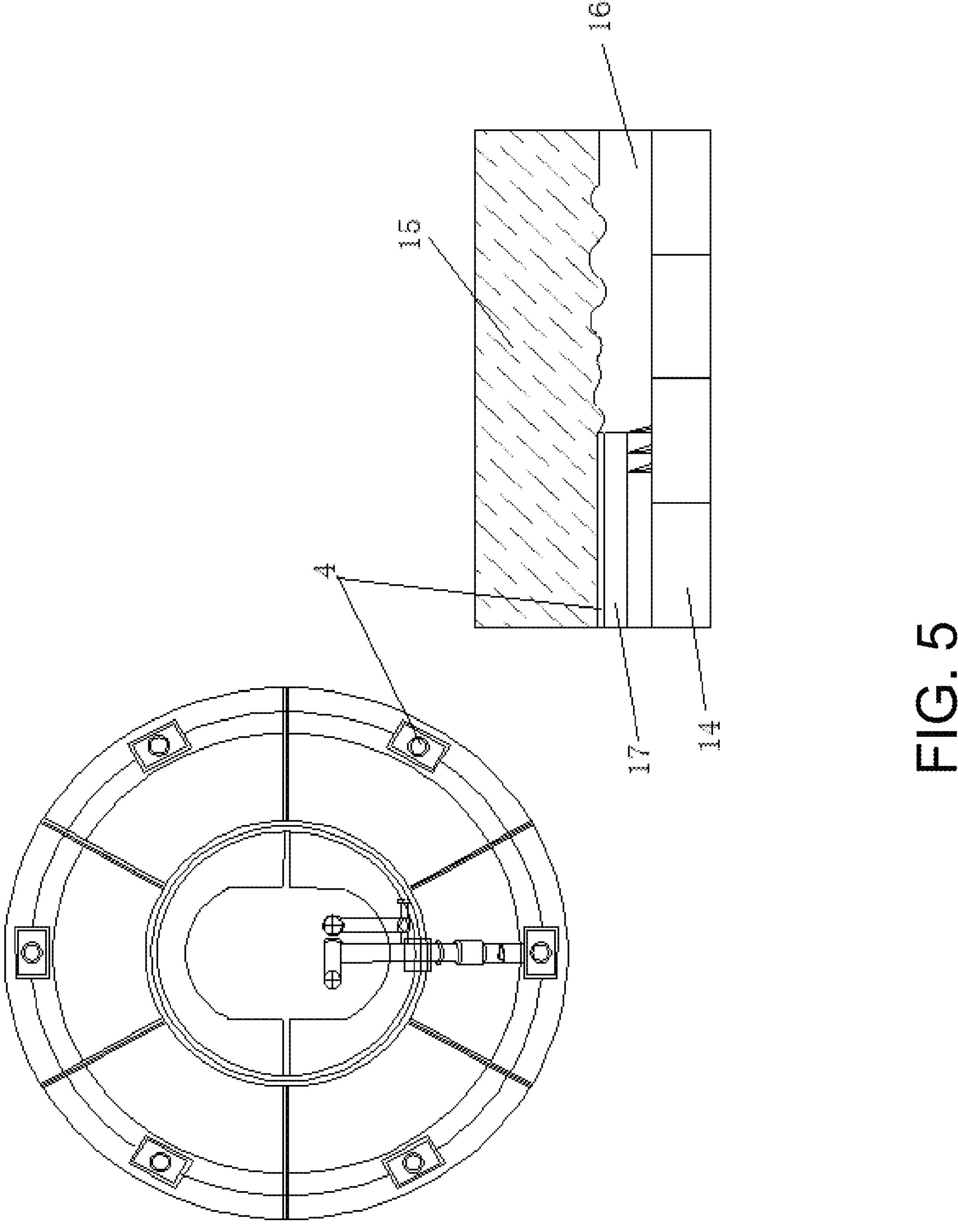
FIG. 5 shows the schematic diagram of six-point synchronous grouting at the end of the shield of the underwater shield tunnel.

The double-liquid grouting slurry of this invention can be used in the shield tunnel grouting project with high water pressure and super large diameter underwater weakened soil strata. The double-liquid slurry can be synchronously injected through a synchronous grouting system suitable for double-liquid grouting in underwater shield tunnels, as shown in FIG. 5. The synchronous grouting system comprises 6 synchronous grouting units, each unit includes a slurry I delivery pipe, slurry II delivery pipe, scouring liquid delivery pipe and double-liquid delivery pipe. The double liquid slurry delivery pipe is a straight pipe, and the double liquid delivery pipe is connected in the gap between the soil and the segment, and it is used to fill the double liquid slurry in the gap between the soil and the segment. One end of the double slurry conveying pipe is closed, and the other end is a liquid outlet. The double slurry delivery pipe is provided with a slurry I inlet and a scouring liquid inlet. The slurry inlet and the scouring liquid inlet are located on both sides of the double slurry delivery pipe respectively, and the slurry inlet is closer to the outlet of the double slurry delivery pipe. The double slurry delivery pipe is also provided with a mixing pump that can move along the diameter of the double slurry delivery pipe. The top of the mixing pump is provided with a feeding port. The same side of the mixing pump and the liquid outlet of the double slurry delivery pipe is provided with a discharging port, and the discharging port is provided with a second grouting port. The outer diameter of the mixing pump is nearly the same as the inner diameter of the double slurry delivery pipe.

Wherein the slurry I inlet is connected with a slurry I delivery pipe, the other end of slurry I delivery pipe is connected with a slurry I storage tank. There is a slurry II inlet on the slurry I delivery pipe, the slurry II inlet is connected to a slurry II delivery pipe, and the other end of the slurry II delivery pipe is connected with a slurry II storage tank, and there is a first injection port at an outlet of the slurry II delivery pipe. Transfer pumps are provided on both the slurry I delivery pipe and the slurry II delivery pipe. As shown in FIG. 2, before grouting, the mixing and stirring pump is located at the inlet of the scouring liquid, and as shown in FIG. 3, the mixing and stirring pump in the double-liquid slurry delivery pipe moves to the inlet of slurry one during grouting, and the slurry I and the slurry II are pumped into the mixing and stirring pump according to a certain volume ratio through the delivery pump, and the mixed double-liquid slurry flows out from the second injection port of the mixing and stirring pump, and the slurry is finally injected into the voids formed by the pipe sheet and soil body through the outlet of the double-liquid slurry delivery pipe.

Figure 4:
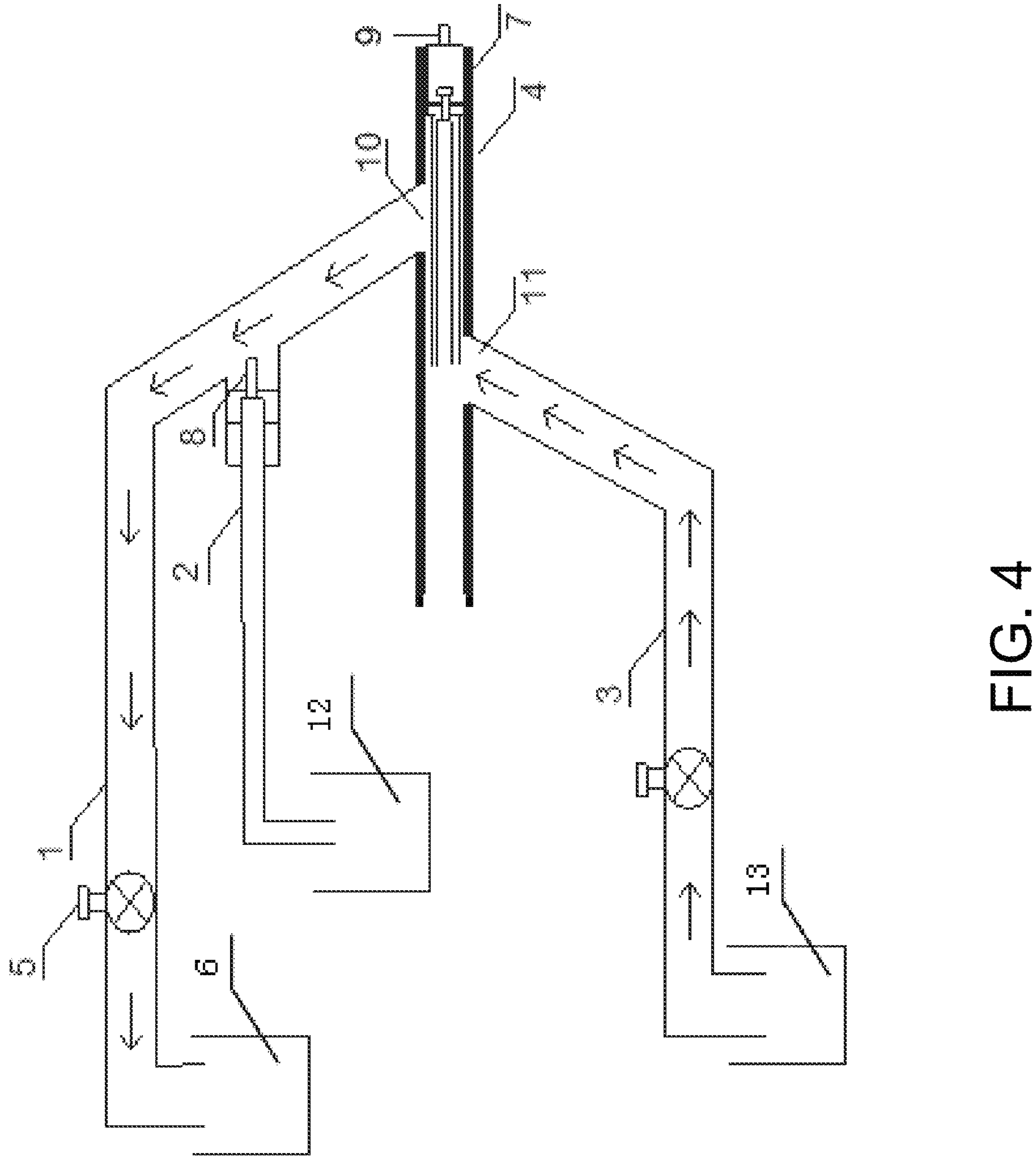
FIG. 4 shows the structure of the synchronous grouting unit in the underwater shield tunnel after grouting.

The scouring fluid inlet is connected to the scouring fluid delivery pipe, and the other end of the scouring fluid delivery pipe is connected to the scouring fluid storage tank. A delivery pump is also provided on the scouring fluid delivery pipe. As shown in FIG. 4, after the injection completion in one ring, the mixing pump moves to the outlet of the double-liquid slurry delivery pipe to block the outlet of the double-liquid slurry delivery pipe, and then the scouring liquid is pumped into the slurry delivery pipe through the delivery pump to scour, it prevents blocking the slurry I delivery pipe and thus the next ring injection is not affected.

Further, when the above synchronous grouting system is used for synchronous grouting with the double-liquid slurry of the present invention, the shield tail grouting is used, and the grouting schematic diagram is shown in FIG. 5. The invention uses 6 points synchronous double-liquid slurry injection points at the shield tail, each synchronous grouting unit is evenly distributed around a circle, the double-liquid slurry delivery pipes of each synchronous grouting unit are also around a circle, and each double-liquid slurry delivery pipe is evenly distributed and located in the gap between the soil (or water) and the pipe sheet. During grouting, the slurry I and the slurry II are added into the slurry I storage tank and slurry II storage tank of each synchronous grouting unit, and the slurry 1 and the slurry 2 are mixed in the mixing and stirring pump with the volume ratio of 1:1-10:1 (preferably 3:1-10:1), and the mixed double-liquid slurry flows out from the six double-liquid slurry delivery pipes at the same time, with a the grouting pressure being 0.5-0.9 MPa, and a grouting volume is being at 100-200 L/min. The grouting method corresponds to the 3+2+1 splicing mode of the pipe piece, and the grouting is well-filled with a 150-250% grouting rate per ring.

Figure 6:
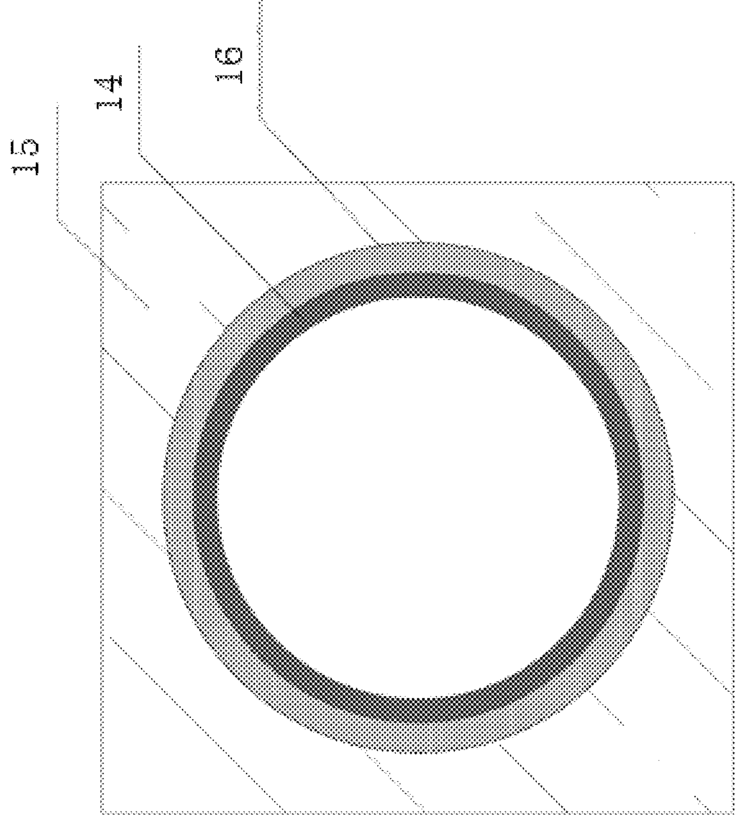
FIG. 6 shows the schematic diagram of the filling pattern after grouting in the underwater shield tunnel.

The specific grouting and cleaning steps are as follows:

1. The mixing and stirring pump is moved to the inlet of slurry I, and the flow rate of the slurry I and the slurry II are adjusted, so that the slurry I and the slurry II are mixed into the mixing and stirring pump with a certain volume ratio.
2. The combined mixing pump mixes the slurry I and the slurry II evenly, and injects them into the gap between the soil and the pipe sheet through the second grouting port. FIG. 6 shows the filling state after grouting, the double-liquid slurry is surrounding the pipe sheet evenly and there is no contact between the pipe sheet and the soil.
3. After the completion of grouting for one ring pipe piece, the mixing and stirring pump is moved to the right, then the scouring liquid is put into the slurry I delivery pipe, it is along the scouring liquid delivery pipe and the double liquid slurry delivery pipe to scour the slurry I delivery pipe and prevent the pipeline from blocking. Thus the grouting of the next ring pipe piece is not affected.

The above description is only a preferred embodiment of the present invention, it is not intended to limit the present invention. This invention may be subject to various modifications and variations for those people skilled in the field. Within the spirit and principles of the present invention, any modification, equivalent replacement, or improvement shall be within the protection scope of the present invention.

What is claimed is:

1. A double-liquid grouting slurry for super large diameter underwater shield engineering under high water pressure condition, comprising slurry I and slurry II, wherein slurry I comprises the following raw materials in weight: 35-45 parts of silicate cement clinker, 15-25 parts of granulated blast furnace slag, 24-35 parts of fly ash, 15-25 parts of steel slag, 5-15 parts of bentonite, 4-10 parts of limestone tailing powder, 0.3-2.0 parts of water reducing agent, 0.5-2.5 parts of cellulose, and an amount of water meets a water-binder ratio (w/b) of 0.8:1-1.5:1, the binder includes silicate cement clinker, granulated blast furnace slag, fly ash, steel slag, bentonite, and limestone tailing powder, wherein the slurry II comprises the following raw materials in weight: 0.2-3.8 parts of short-cut fiber, 96-99 parts of sodium silicate solution, 0.8-4.8 parts of viscous polymer, wherein the water reducing agent is a mixture of naphthalene water reducing agent and polycarboxylic acid water reducing agent with a mass ratio of 3:1-3:2, wherein the short-cut fiber is a mixture of short-cut basalt fiber and short-cut polypropylene fiber with a mass ratio of 2:1-3:1, wherein the viscous polymer is a mixture of acrylate polymer, ethylene vinyl acetate copolymer and polyvinyl alcohol with a mass ratio of 1:1:1-1:2:1, wherein a volume ratio of slurry I to slurry II is 1:1-10:1.

2. The double-liquid grouting slurry according to claim 1, wherein a diameter of the basalt fiber is 7-20 μm, a length of a monofilament of the basalt fiber is 5-20 mm, a density of the basalt fiber is 2-3 $g/cm^3$, and a diameter of the polypropylene fiber is 9-30 μm, a length of a monofilamen of the polypropylene fiber is 3-8 mm, a density of the polypropylene fiber is 1-2 $g/cm^3$.

3. The double-liquid grouting slurry according to claim 1, wherein the bentonite is a sodium-based bentonite, the cellulose is a hydroxypropylmethyl cellulose, and a Baume degree of the sodium silicate solution is 35-40° Bé.

4. The double-liquid grouting slurry according to claim 1, wherein a sieving residue of the silicate cement clinker through 80 μm sieve is not more than 4%; a density of the granulated blast furnace slag is not less than 2.8 $g/cm^3$, a specific surface area of the granulated blast furnace slag is not less than 400 $m^2/kg$, a water content of the granulated blast furnace slag is not more than 1%; the fly ash is a secondary ash, a sieving residue of the fly ash through 45 μm sieve is 12-20%, a water demand ratio of the fly ash is 95-100%, a water content of the fly ash is not more than 1%; a specific surface area of the steel slag powder is not less than 350 $m^2/kg$, a content of free calcium oxide of the steel slag powder is not more than 3%; a calcium carbonate mass fraction in the limestone tailing powder is not less than 80%, and a mass fraction of aluminum oxide in the limestone tailing powder is not more than 2%.

5. A preparation method for the double-liquid grouting slurry for super large diameter underwater shield engineering under high water pressure condition, according to claim 1, comprising:

(1) silicate cement clinker, granulated blast furnace slag, steel slag, and limestone tailings being crushed respectively, then ball-milled until maximum particle sizes being less than 120 μm, and then being dried and placed at room temperature respectively for later use, (2) the grounded silicate cement clinker powder and granulated blast furnace slag powder being mixed and stirred at 150-250 r/min for 60-80 s to obtain a homogeneous mixture I, (3) fly ash, steel slag powder, bentonite and limestone tailing powder being mixed, and stirred at 150-250 r/min for 60-80 s to obtain a homogeneous mixture II, (4) water-reducing agent being mixed with a first portion of water and being stirred at 350-450 r/min for 20-30 s to obtain an admixture I solution; cellulose being mixed with a second portion of water and stirred at 350-450 r/min for 20-30 s to obtain the admixture II solution, (5) the remaining water, the mixture I and the mixture II being stirred at 450-550 r/min for 120-140 s to obtain mixture III, (6) the admixture I solution and the admixture II solution being added to the mixture III in step (5), being mixed and stirred at 450-550 r/min for 120-180 s to obtain slurry I, (7) viscous polymers being added to a sodium silicate solution, and being stirred at 550-700 r/min for 120-150 s to obtain liquid mixture IV, (8) short-cut fibers being added to liquid mixture IV, and being stirred at 550-700 r/min for 150-180 s to obtain slurry II.

6. An application of the double-liquid grouting slurry for super large diameter underwater shield engineering under high water pressure condition according to claim 1, wherein the double-liquid grouting slurry is applied for underwater shield tunneling with subsurface water pressure greater than or equal to 0.5 MPa, and diameter greater than or equal to 14 m, wherein during underwater shield tunneling, applicable strata include high water-pressure fine-medium-coarse sand strata, high water-pressure cohesive soil strata, and high water-pressure silt sand strata.

7. A double-liquid grouting process for super large diameter underwater shield engineering under high water pressure condition, comprising:

a double-liquid grouting slurry according to claim 1 being added to a synchronous grouting system for shield synchronous grouting, wherein a volume ratio of slurry I to slurry II is 1:1-10:1.

8. The double-liquid grouting process according to claim 7, wherein a volume ratio of slurry I to slurry II is 3:1-10:1.

9. The double-liquid grouting process according to claim 7, wherein the synchronous grouting system comprises 6 synchronous grouting units, wherein each of the synchronous grouting units comprises a double-liquid slurry delivery pipe, the double-liquid slurry delivery pipe is provided with a slurry I inlet and a scouring liquid inlet, the slurry I inlet and the scouring liquid inlet are connected with a slurry I delivery pipe and a scouring liquid delivery pipe respectively, the slurry I delivery pipe is connected with a slurry I storage tank, the scouring liquid delivery pipe is connected with scouring liquid storage tank; the slurry I delivery pipe is provided with a slurry II inlet, the slurry II inlet is connected to a slurry II delivery pipe, the slurry II delivery pipe is connected with a slurry II storage tank, and the slurry II delivery pipe has a first injection port at an outlet of the slurry II delivery pipe; the double-liquid slurry delivery pipe is equipped with a mixing and stirring pump that moves along the double-liquid slurry delivery pipe, and the mixing and stirring pump has an inlet port at a top, and the mixing and stirring pump has a discharge port on the same side as a discharge port of the double-liquid slurry delivery pipe, and a second slurry injection port is on the outlet port.

10. The double-liquid grouting process according to claim 9, wherein the slurry I inlet and the scouring liquid inlet are positioned on both sides of the double-liquid slurry delivery pipe, and a distance between the slurry I inlet and the outlet of double-liquid slurry delivery pipe is closer than a distance between the scouring liquid inlet and the outlet of double-liquid slurry delivery pipe.

11. The double-liquid grouting process according to claim 10, wherein the slurry I delivery pipe, the slurry II delivery pipe, and the scouring liquid delivery pipe are all equipped with delivery pumps.

12. The double-liquid grouting process according to claim 10, wherein each of the synchronous grouting units are distributed evenly around a circle, when grouting, the slurry I and the slurry II are added into the slurry I storage tank and the slurry II storage tank of each of the synchronous grouting units respectively, the slurry I and the slurry II are pumped into the mixing and stirring pump for mixing, a mixed double-liquid slurry flows out from six double-liquid slurry delivery pipes at the same time, with a grouting pressure being 0.5-0.9 MPa, and a grouting volume being controlled at 100-200 L/min.

13. A preparation method for the double-liquid grouting slurry for super large diameter underwater shield engineering under high water pressure condition, according to claim 2, comprising:

(1) silicate cement clinker, granulated blast furnace slag, steel slag, and limestone tailings being crushed respectively, then ball-milled until maximum particle sizes being less than 120 μm, and then being dried and placed at room temperature respectively for later use, (2) the grounded silicate cement clinker powder and granulated blast furnace slag powder being mixed and stirred at 150-250 r/min for 60-80 s to obtain a homogeneous mixture I, (3) fly ash, steel slag powder, bentonite and limestone tailing powder being mixed, and stirred at 150-250 r/min for 60-80 s to obtain a homogeneous mixture II, (4) water-reducing agent being mixed with a first portion of water and being stirred at 350-450 r/min for 20-30 s to obtain an admixture I solution; cellulose being mixed with a second portion of water and stirred at 350-450 r/min for 20-30 s to obtain the admixture II solution, (5) the remaining water, the mixture I and the mixture II being stirred at 450-550 r/min for 120-140 s to obtain mixture III, (6) the admixture I solution and the admixture II solution being added to the mixture III in step (5), being mixed and stirred at 450-550 r/min for 120-180 s to obtain slurry I, (7) viscous polymers being added to a sodium silicate solution, and being stirred at 550-700 r/min for 120-150 s to obtain liquid mixture IV, (8) short-cut fibers being added to liquid mixture IV, and being stirred at 550-700 r/min for 150-180 s to obtain slurry II.

14. A preparation method for the double-liquid grouting slurry for super large diameter underwater shield engineering under high water pressure condition, according to claim 3, comprising:

(1) silicate cement clinker, granulated blast furnace slag, steel slag, and limestone tailings being crushed respectively, then ball-milled until maximum particle sizes being less than 120 μm, and then being dried and placed at room temperature respectively for later use, (2) the grounded silicate cement clinker powder and granulated blast furnace slag powder being mixed and stirred at 150-250 r/min for 60-80 s to obtain a homogeneous mixture I, (3) fly ash, steel slag powder, bentonite and limestone tailing powder being mixed, and stirred at 150-250 r/min for 60-80 s to obtain a homogeneous mixture II, (4) water-reducing agent being mixed with a first portion of water and being stirred at 350-450 r/min for 20-30 s to obtain an admixture I solution; cellulose being mixed with a second portion of water and stirred at 350-450 r/min for 20-30 s to obtain the admixture II solution, (5) the remaining water, the mixture I and the mixture II being stirred at 450-550 r/min for 120-140 s to obtain mixture III, (6) the admixture I solution and the admixture II solution being added to the mixture III in step (5), being mixed and stirred at 450-550 r/min for 120-180 s to obtain slurry I, (7) viscous polymers being added to a sodium silicate solution, and being stirred at 550-700 r/min for 120-150 s to obtain liquid mixture IV, (8) short-cut fibers being added to liquid mixture IV, and being stirred at 550-700 r/min for 150-180 s to obtain slurry II.

15. A preparation method for the double-liquid grouting slurry for super large diameter underwater shield engineering under high water pressure condition, according to claim 4, comprising:

(1) silicate cement clinker, granulated blast furnace slag, steel slag, and limestone tailings being crushed respectively, then ball-milled until maximum particle sizes being less than 120 μm, and then being dried and placed at room temperature respectively for later use, (2) the grounded silicate cement clinker powder and granulated blast furnace slag powder being mixed and stirred at 150-250 r/min for 60-80 s to obtain a homogeneous mixture I, (3) fly ash, steel slag powder, bentonite and limestone tailing powder being mixed, and stirred at 150-250 r/min for 60-80 s to obtain a homogeneous mixture II, (4) water-reducing agent being mixed with a first portion of water and being stirred at 350-450 r/min for 20-30 s to obtain an admixture I solution; cellulose being mixed with a second portion of water and stirred at 350-450 r/min for 20-30 s to obtain the admixture II solution, (5) the remaining water, the mixture I and the mixture II being stirred at 450-550 r/min for 120-140 s to obtain mixture III, (6) the admixture I solution and the admixture II solution being added to the mixture III in step (5), being mixed and stirred at 450-550 r/min for 120-180 s to obtain slurry I, (7) viscous polymers being added to a sodium silicate solution, and being stirred at 550-700 r/min for 120-150 s to obtain liquid mixture IV, (8) short-cut fibers being added to liquid mixture IV, and being stirred at 550-700 r/min for 150-180 s to obtain slurry II.

16. An application of the double-liquid grouting slurry for super large diameter underwater shield engineering under high water pressure condition according to claim 2, wherein the double-liquid grouting slurry is applied for underwater shield tunneling with subsurface water pressure greater than or equal to 0.5 MPa, and diameter greater than or equal to 14 m, wherein during underwater shield tunneling, applicable strata include high water-pressure fine-medium-coarse sand strata, high water-pressure cohesive soil strata, and high water-pressure silt sand strata.

17. An application of the double-liquid grouting slurry for super large diameter underwater shield engineering under high water pressure condition according to claim 3, wherein the double-liquid grouting slurry is applied for underwater shield tunneling with subsurface water pressure greater than or equal to 0.5 MPa, and diameter greater than or equal to 14 m, wherein during underwater shield tunneling, applicable strata include high water-pressure fine-medium-coarse sand strata, high water-pressure cohesive soil strata, and high water-pressure silt sand strata.

18. An application of the double-liquid grouting slurry for super large diameter underwater shield engineering under high water pressure condition according to claim 4, wherein the double-liquid grouting slurry is applied for underwater shield tunneling with subsurface water pressure greater than or equal to 0.5 MPa, and diameter greater than or equal to 14 m, wherein during submerged shield tunneling, applicable strata include high water-pressure fine-medium-coarse sand strata, high water-pressure cohesive soil strata, and high water-pressure silt sand strata.

19. A double-liquid grouting process for super large diameter underwater shield engineering under high water pressure condition, comprising:

a double-liquid grouting slurry according to claim 2 being added to a synchronous grouting system for shield synchronous grouting, wherein a volume ratio of slurry I to slurry II is 1:1-10:1.

20. A double-liquid grouting process for super large diameter underwater shield engineering under high water pressure condition, comprising:

a double-liquid grouting slurry according to claim 3 being added to a synchronous grouting system for shield synchronous grouting, wherein a volume ratio of slurry I to slurry II is 1:1-10:1.

* * * * *